J. GROSS.

Corn-Planter.

No. 2,135. Reissued Dec. 26, 1865.

Witnesses:
M. Luane Jr
J. M. Covington

Inventor:
Jno Gross
By Munn & Co.
Attys.

N. PETERS, PHOTO-LITHOGRAPHER, WASHINGTON, D. C.

UNITED STATES PATENT OFFICE.

JOHN H. ALEXANDER AND DAVID R. ALEXANDER, OF DECATUR, ILLINOIS, ASSIGNEES, BY MESNE ASSIGNMENTS, OF JOHN GROSS.

IMPROVEMENT IN CORN-PLANTERS.

Specification forming part of Letters Patent No. 48,130, dated June 6, 1865; Reissue No. 2,135, dated December 26, 1865.

*To all whom it may concern:*

Be it known that JOHN GROSS, of Decatur, in the county of Macon and State of Illinois, did invent a new and useful Improvement in Corn-Planters; and we do hereby declare that the following is a full, clear, and exact description of the same, reference being had to the accompanying drawings, making a part of this specification, in which—

Figure 1:
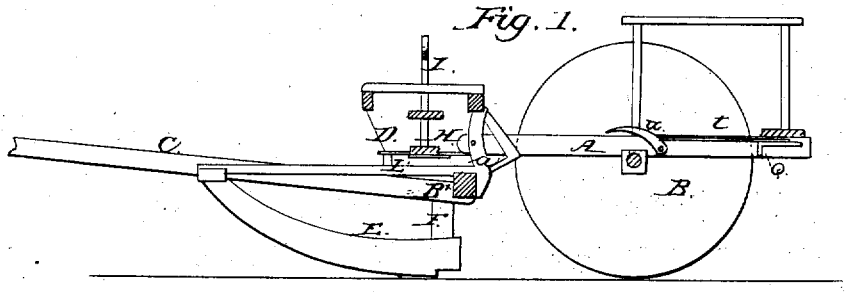
Figure 2:
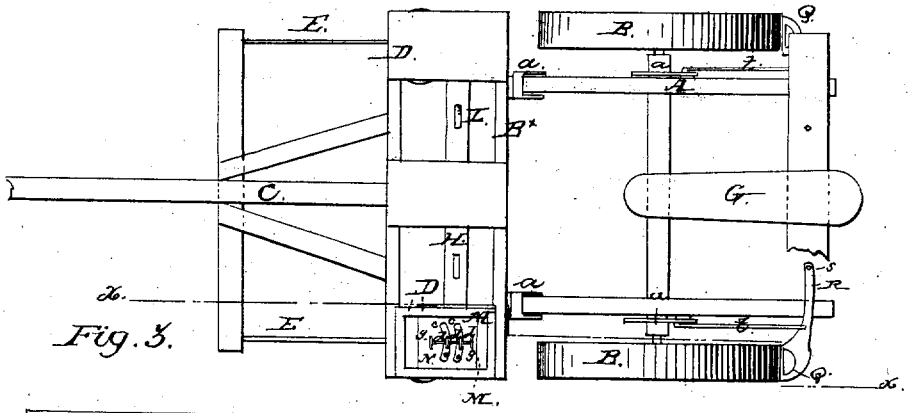
Figure 3:
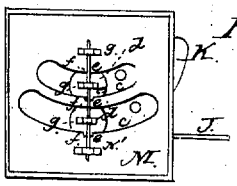

Figure 1 represents a side sectional view of the invention, taken in the line *x x* of Fig. 2. Fig. 2 represents a top plan of the machine. Figs. 3, 4, 5, 6, 7, 8, 9, and 10 represent enlarged detached views of parts pertaining to the seed-distributing device.

Similar letters of reference, where they occur in the separate figures, denote like parts in all the drawings.

This invention relates to a new and improved seed-distributing apparatus, together with appliances to render its action more certain and uniform in the field; and the invention consists, first, in the employment or use of four holes or openings in the seed-plates, from which the seeds are dropped successively or in regular rotation, one hole dropping while the remaining three holes are filling, thus giving the holes more time to fill without impeding the dropping or planting.

The invention further consists in the employment or use of circular intermittingly-rotating plates provided with two holes, in combination with a vibrating seed-plate having four holes, the latter delivering its charges of grain in rotation and one at a time.

The invention further consists in the employment or use of vibrating bars placed below or underneath the intermittingly-rotating plate, and used in connection with the hopper-plate for the purpose of dropping single charges from the four holes in succession.

The invention further consists in the employment or use of circular adjustable gages underneath the intermittingly-rotating plates for graduating the capacity of the holes in the seeding-plates.

The invention further consists in arranging the cut-offs or strikes with springs or elastic rods, so that they may yield to any undue pressure from the overcharged holes; and, finally, the invention consists in a certain application of scrapers to the carrying or supporting wheels, to prevent them from being clogged with the soft or mellowed earth over which they pass.

To enable others skilled in the art to make and use the invention of the said JOHN GROSS, we will proceed to describe the same with reference to the drawings, first stating that the general plan of dropping seeds from a hopper, as in planting corn, before that devised by the said GROSS was by two holes, which alternately filled and dropped their charges into tubes or seed-ducts that conveyed the seed to the furrow. The ordinary speed or motion of the seed slide or plate is such as to give the cells or holes therein but a limited and insufficient period to fill when but two holes reciprocated or alternated with each other. JOHN GROSS changed this two-hole alternating system into a four-hole alternating system, thus giving the cells or holes twice the period to fill that they previously had, the dropping remaining the same as before, but of course requiring a reorganization to make the dropping conform to the changed feeding or charging of the four holes.

A represents a rectangular frame, which is mounted on wheels B B, and is connected by joints or hinges *a a* to a frame, B$^{\times}$, which has the draft-pole C attached to it, and also two seed-boxes, D D—one at each end thereof. To this frame B$^{\times}$ two furrow-openers, E E, are attached—one at each side in line with the seed-boxes D D—the rear ends of the furrow-openers E E being forked to receive the lower ends of the seed-conveying tubes F, which extend down from the seed-boxes D D.

Figure 4:
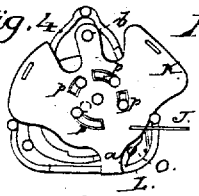
Figure 5:
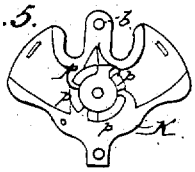

G is the driver's seat, placed on the frame A; and H is a reciprocating slide, which is operated by a lever, I, and is connected at each of its ends by a link, J, with a seed-plate, K, which works around or from a pin or pivot, *b*, as a center in a skeleton box or frame, L, secured one to the bottom of each seed-box, as seen in Fig. 4.

To the bottom of each seed-box D there is secured a metal plate, M, and these plates have two curved slots, *c c*, made in them, each of which has a cut-off or strike, *d*, fitted in it. The cut-offs or strikes are also prevented from rising out of the slots by means of a spring or elastic rod, N′, which passes through cleats *g* on the plate M and cut-offs or strikes, said springs, on account of their being merely small rods, not interfering in the least with the corn or seed in the boxes D.

The seed-plates K have four holes, *h*, made in them, which are in the path of a circle, as seen in Fig. 4, and these holes work in line with the slots *c c* in the plate M as the plates K are vibrated from the slide H, the seed being discharged through said holes when the latter pass under the cut-offs or strikes *d*.

Underneath the seed-plates K there are placed circular plates N, which work on a central pivot, *i*, in the frames or boxes L, a plate, N, being under each plate K. These plates N have each two holes, *j j*, made in them, and the edges of said plates are provided with four shoulders or projections, *k*, at equal distances apart, as shown in Figs. 7 and 8.

Figure 7:
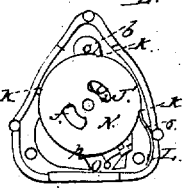
Figure 8:
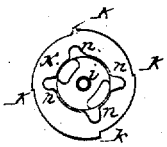
Figure 9:
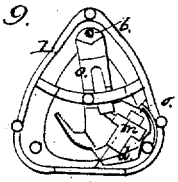
Figure 10:
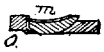

Underneath the circular plates N there are placed bars O, which work on the same pivot or from the same centers as the seed-plates K do, as seen in Figs. 7 and 9. These bars O are connected with the plates K by a pivot, *l*, and said bars are each provided with a pawl, *m*, by which the circular plates N are rotated. (See Figs. 9 and 10.) The pawls *m* engage with projections *n* on the under sides of the plates N. (Shown in Fig. 8.)

The office of the circular plates N is to allow the seed being discharged through the holes *h* to pass only at the proper time, and this occurs when a hole, *j*, comes in line with a hole, *h*, underneath a cut-off or strike, *d*, and the plates N are turned a quarter-revolution at each vibration or movement of the plates K and bars O, and the seed discharged consecutively from the holes *h* in the plates K; but a discharge is made simultaneously from the two seed-boxes. The plates N are prevented from turning backward by a pawl, *o*, attached to the skeleton boxes or frames L.

Figure 6:
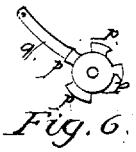

On the under side of each plate K there is fitted a circular gage, P, Fig. 6, provided with projections *p*. By turning these gages P the the capacity of the holes *h* may be varied as desired, according to the quantity of seed required for each dropping. The gages are provided with an arm, *q*, through the outer end of which and a slot in the plates K, a pin, *r*, passes, in order to secure the gages at any desired point.

Q Q represent two scrapers, which are at the outer ends of arms R R, the latter being attached by pivots *s* to the rear part of the frame A, as seen in Fig. 2. The arms R R are connected by rods *t* to treadles *u u*. The scrapers are in line with the wheels B B, and are at the rear sides of the same, and the driver by pressing down the treadles *u u* with his feet causes the scrapers to bear against the wheels and effectually clean the same from dirt which may adhere to them.

Having thus fully described the seed or corn planter, what is claimed as the invention of JOHN GROSS is—

1. The employment or use of four seed-holes, *h*, in the seed-plate K, from which the seeds are discharged consecutively while the remaining holes are being filled or charged, substantially as and for the purpose described.

2. The employment or use of circular intermittingly-rotating plates N, provided with openings or holes *j j*, in combination with the vibrating seed-plates K, substantially as and for the purpose specified.

3. The vibrating bars O, placed below or underneath the plates N, connected with the plates M and receiving their motion therefrom, and provided with pawls *m*, for the purpose of operating the plate N, as set forth.

4. The circular gages P, placed underneath the plates N and arranged, substantially as shown, for graduating the capacity of the holes *h* in the plates K, as set forth.

5. The arranging of the cut-offs or strikes *d* with springs or elastic rods N′, in the manner substantially as and for the purpose specified.

6. The scrapers Q Q at the outer ends of the arms R R, which are connected by rods *t* to treadles *u*, substantially as and for the purpose specified.

JOHN H. ALEXANDER.
DAVID R. ALEXANDER.

Witnesses to signature of John H. Alexander:

E. S. JONES,
EDMORTON MCCLELLAN.

Witnesses to signature of D. R. Alexander:

WM. SULLIVAN,
MILTON WOOLLEN.